May 4, 1937.                C. O. J. MONTELIUS                2,079,083
                                FLUID METER
                            Filed March 21, 1936

INVENTOR:
CARL OSCAR JOSEF MONTELIUS
BY Haseltine, Lake & Co.
ATTORNEYS

Patented May 4, 1937

2,079,083

UNITED STATES PATENT OFFICE 2,079,083

FLUID METER

Carl Oscar Josef Montelius, Stockholm, Sweden, assignor to Aktiebolaget Imo-Industri, Stockholm, Sweden, a corporation of Sweden Application March 21, 1936, Serial No. 70,065
In Sweden March 29, 1935

6 Claims. (Cl. 73—261)

My present invention relates to an apparatus for measuring the volume of a fluid, i. e. a liquid or a gas flowing through a conduit, said apparatus comprising a number of rotary intermeshing screws, one of which is connected to a register for registering the flow, and a housing having intersecting bores fitting to the circumference of the screws and possessing at its ends inlet and outlet for the fluid.

In meters of this type previously known, the screws have been supported by shafts running in radial bearings and in addition thereto also geared to each other by gear wheels or the like. Thus, the screws have rotated substantially without touching the walls of the bores of the housing. The intention was evidently to avoid friction as much as possible in order to get a high sensitivity.

The principal object of my invention is to provide a liquid or gas meter which is more simple and durable than those previously known and by which a high accuracy of measurement is attained and maintained.

A further object of my invention is to provide a liquid or gas meter of the type described in which the screw or screws which are not connected to the register are rotating and moving freely in their bores, axially as well as radially, without any positive connection in the form of gears, radial bearings or the like. By this free movability it is possible for the screws to adjust themselves in axial direction, while simultaneously turning in relation to each other which gives a smooth motion and improves the accuracy of measurement. A still further object of my invention is to provide a liquid or gas meter of the type described, in which the axial movement of the screws is limited on the one hand by pivot bearings and on the other hand by thrust bearings. At rest and at low flows the screws are supported by the pivot bearings having a pointed or ball-shaped support of practically no friction but also of low strength, whereas, when the flow and the speed reach a certain value, the screws are lifted and the pressure is taken up by the thrust bearings which are of comparatively greater strength. The unavoidable friction in these bearings is of no importance at the corresponding high rotating power.

Further objects of my invention will be apparent according as the following description proceeds, reference being had to the accompanying drawing illustrating by way of example an embodiment of my new meter.

In the drawing:—

Figure 1:
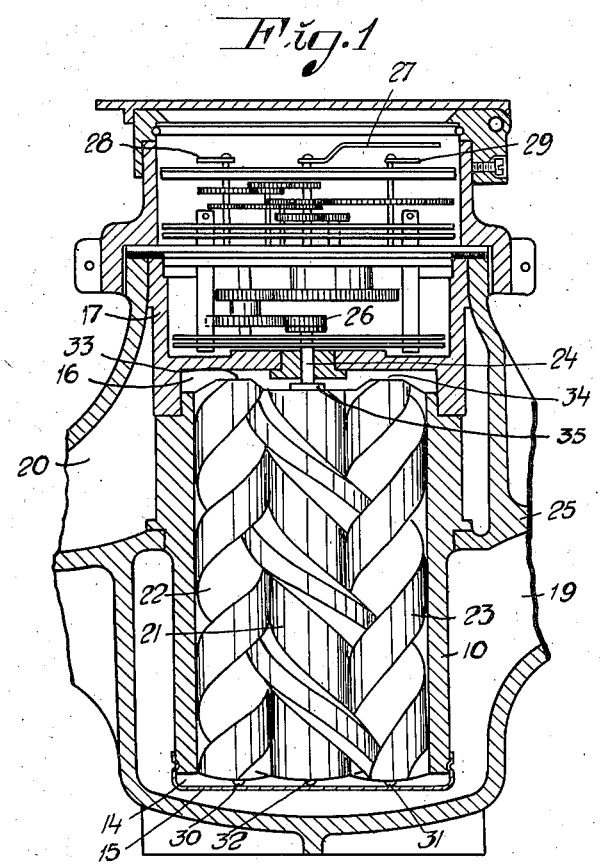
Fig. 1 is a longitudinal sectional view of a liquid or gas meter according to the invention, the screws being shown non-sectioned.
Figure 2:
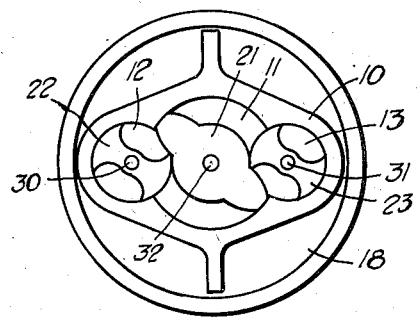
Fig. 2 is a lower end view of the screws.

According to the embodiment shown, the meter comprises a housing 10 disposed in a casing 25. The housing 10 has a central cylindrical bore 11 and two cylindrical side bores 12 and 13 extending in parallel to said central bore and intersecting same. The combined bore opens at its lower end into an inlet chamber 14 limited by a plate 15 detachably secured to the housing 10, and at its upper end into an outlet chamber 16 limited by a cover 17 fitting to a shoulder on the housing 10. The inlet chamber 14 communicates by means of recesses 18 external to the housing 10 with an inlet opening 19, plate 15 being of limited width so as not to prevent flow from recesses 18 into bores 11, 12 and 13, and the outlet chamber 16 communicates by means of similar recesses with an outlet opening 20. Rotatably mounted in the central bore is a main screw 21 and in each of the side bores 12 and 13 a side screw 22 and 23, respectively. These latter serve substantially tightening purposes, closing the grooves of the threads of the main screw. The screw surfaces are so shaped as to form a tight fit to each other in a manner previously known.

At its top the main screw 21 is provided with a spindle 24 which drives the hands 27, 28 and 29 of a register by the medium of a pinion 26 and a gear train of any well-known kind.

According to the invention the side screws 22 and 23 are freely movable in their bores 12 and 13, axially as well as radially. For this purpose, on the one hand, there is a relatively great play in axial direction as shown in Fig. 1 and, on the other hand, the free movability of the side screws in radial direction is not hindered by any positive connections in the form of radial bearings, gears, or the like. At their lower end the screws 21, 22 and 23 are each provided with a pointed or ball-shaped pivot 32, 30 and 31, respectively, supported by the plate 15 at rest and at low flows. At their upper end the screws 21, 22 and 23 are each provided with a bearing surface 35, 33 and 34, respectively, by which they bear on the bottom of the cover 17 at higher flows. The thrust bearings thus formed may be designed in any suitable manner.

The operation of the apparatus is as follows:

At low flows at which there were difficulties in meters of this type heretofore known to attain a sufficient sensibility, all of the screws rotate on their pivots 30, 31 and 32. If the friction somewhat increases in consequence of any irregularity in any position of the screws, the corresponding side screw will move upwardly while performing a slight screw-movement in relation to the main screw whereby the running is facilitated. This slight movability of the screws in relation to each other is of considerable importance to avoid friction and to obtain good accuracy of measurement.

At higher flows the screws are lifted from their support, i. e. the plate 15, bringing the surfaces 33, 34 and 35 into engagement with the bottom of the cover 17.

The invention is not limited to the embodiment shown and described. Only one side screw may be used, or the number of said screws may be greater than two.

What I claim is:—

1. A fluid meter, comprising a housing having a plurality of upright intersecting bores, there being inlet and outlet ports spaced apart in the housing and disposed so that the flow in said bores is upward, upright rotary inter-meshing screws placed each in one of said bores and fitting to the wall thereof, a register connected to one of the screws, the other screw or screws being mounted to rotate freely in their bores without radial bearings, pivot bearings for the screws at the lower end of the housing, thrust bearings for the screws at the upper end of said housing, said pivot and thrust bearings being so arranged as to cause the screws at low flow to be supported by the pivot bearings and at higher flow to be moved out of engagement with said pivot bearings into engagement with said thrust bearings.

2. A fluid meter, comprising a housing having a plurality of upright intersecting bores, upright rotary intermeshing screws placed each in one of said bores and fitting to the wall thereof, a register connected to one of the screws, the other screw or screws being mounted to rotate freely in their bores without radial bearings, an inlet port at the lower end and an outlet port at the upper end of the housing, pivot bearings for the screws at the inlet end and thrust bearings of comparatively greater strength at the outlet end of said housing, said pivot and thrust bearings being so arranged in relation to each other as to permit the screws at increasing flow to move out of engagement with the pivot bearings into engagement with the thrust bearings.

3. A fluid meter, comprising a housing having a plurality of upright intersecting bores, upright rotary intermeshing screws placed each in one of the bores and fitting to the wall thereof, all screws except one being mounted to rotate freely in their bores without radial bearings, a register connected to said exceptional screw, an inlet port at the bottom end and an outlet port at the top end of the housing, pivot bearings for the screws at the inlet end and thrust bearings of comparatively greater strength at the outlet end of the housing, said pivot and thrust bearings being so arranged in relation to each other as to provide an axial play for the screws permitting the screws at increasing flow to move out of engagement with the pivot bearings into engagement with the thrust bearings.

4. A fluid meter, comprising a housing having an upright central bore and an upright lateral bore intersecting said central bore, upright rotary intermeshing screws placed each in one of said bores and fitting to the wall thereof, a register connected to the central screw, the screw in the lateral bore being mounted to rotate freely in its bore, an inlet port at the bottom end and an outlet port at the top end of said housing, pivot bearings for the screws at the inlet end and thrust bearings of comparatively greater strength at the outlet end of the housing, said pivot and thrust bearings being so arranged in relation to each other as to provide an axial play for the screws permitting the screws at increasing flow to move out of engagement with the pivot bearings into engagement with the thrust bearings.

5. A vertical fluid meter, comprising a housing having a plurality of vertically extending intersecting bores, rotary intermeshing screws placed each in one of said bores and fitting to the wall thereof, a register connected to one of the screws, the other screw or screws being mounted to rotate freely in their bores without radial bearings, an inlet port at the bottom and an outlet port at the top of said housing, pivot bearings for the screws at their lower ends, thrust bearings for the screws at their upper ends, said pivot and thrust bearings being so arranged in relation to each other as to provide a play for the screws in vertical direction permitting the screws at increasing flow to be lifted out of engagement with the pivot bearings into engagement with the thrust bearings.

6. A vertical fluid meter, comprising a housing having a plurality of vertically extending intersecting bores, rotary intermeshing screws placed each in one of said bores and fitting to the wall thereof, a register connected to the upper end of one of the screws, the other screw or screws being mounted to rotate freely in their bores, an inlet port at the bottom and an outlet port at the top of the housing, a pivot at the lower end of each screw, a lower horizontal member adapted to co-operate with said pivots, a bearing surface at the upper end of each screw, an upper horizontal member adapted to co-operate with said bearing surfaces, said horizontal members being so arranged in relation to each other as to provide a play for the screws in vertical direction permitting the screws at increasing flow to be lifted out of engagement with the lower member into engagement with the upper member.

CARL OSCAR JOSEF MONTELIUS.